(12) United States Patent
Matsuzaki

(10) Patent No.: US 9,784,368 B2
(45) Date of Patent: Oct. 10, 2017

(54) HYDRAULIC CONTROL APPARATUS AND METHOD

(71) Applicant: SUMITOMO HEAVY INDUSTRIES, LTD., Tokyo (JP)

(72) Inventor: Eisuke Matsuzaki, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 331 days.

(21) Appl. No.: 14/217,678

(22) Filed: Mar. 18, 2014

(65) Prior Publication Data
US 2014/0196448 A1    Jul. 17, 2014

Related U.S. Application Data

(63) Continuation of application No. PCT/JP2012/070388, filed on Aug. 9, 2012.

(30) Foreign Application Priority Data

Sep. 21, 2011 (JP) .................. 2011-206441

(51) Int. Cl.
*F16H 61/4061* (2010.01)
*E02F 9/22* (2006.01)
(Continued)

(52) U.S. Cl.
CPC .......... *F16H 61/4061* (2013.01); *E02F 3/32* (2013.01); *E02F 9/2203* (2013.01);
(Continued)

(58) Field of Classification Search
CPC .......... F15B 11/165; F15B 2211/50536; F15B 2211/513; F15B 2211/6306; F15B 2211/6346
See application file for complete search history.

(56) References Cited

U.S. PATENT DOCUMENTS 5,758,499 A    6/1998  Sugiyama et al.
5,873,245 A    2/1999  Kato et al.
(Continued)

FOREIGN PATENT DOCUMENTS

EP    2703652       3/2014
JP    01-275902     11/1989
(Continued)

OTHER PUBLICATIONS

International Search Report mailed on Sep. 18, 2012.

*Primary Examiner* — Thomas E Lazo
*Assistant Examiner* — Matthew Wiblin
(74) *Attorney, Agent, or Firm* — IPUSA, PLLC

(57) ABSTRACT

A hydraulic control apparatus is disclosed that controls a hydraulic pump in a construction machine in which a hydraulic actuator is connected to the hydraulic pump via a directional control valve of a closed center type, and in which a position of the directional control valve is changed according to an operation amount of an operation member. The hydraulic control apparatus includes a virtual negative control pressure calculating part configured to calculate, based on the operation amount of the operation member and a discharge pressure of the hydraulic pump, a virtual negative control pressure when a negative control system is assumed; and a part configured to calculate a control command value for the hydraulic pump based on the virtual negative control pressure.

4 Claims, 13 Drawing Sheets

(51) Int. Cl.
  *F15B 11/16* (2006.01)
  *E02F 3/32* (2006.01)
(52) U.S. Cl.
  CPC .......... *E02F 9/2235* (2013.01); *E02F 9/2296* (2013.01); *F15B 11/165* (2013.01); *F15B 2211/3116* (2013.01)

(56) References Cited

U.S. PATENT DOCUMENTS

| | | | | |
|---|---|---|---|---|
| 6,199,378 | B1 * | 3/2001 | Aardema | F15B 11/006 |
| | | | | 60/468 |
| 6,973,779 | B2 * | 12/2005 | Naaktgeboren | A01B 63/32 |
| | | | | 60/328 |
| 2009/0308068 | A1 * | 12/2009 | Yoshino | E02F 9/2203 |
| | | | | 60/468 |
| 2013/0230413 | A1 | 9/2013 | Yamaji | |
| 2013/0298542 | A1 * | 11/2013 | Lowman | F15B 11/00 |
| | | | | 60/327 |

FOREIGN PATENT DOCUMENTS

| | | |
|---|---|---|
| JP | 06-280810 | 10/1994 |
| JP | 10-047306 | 2/1998 |
| JP | 11-158941 | 6/1999 |
| JP | 11-303809 | 11/1999 |
| JP | 2012-031998 | 2/2012 |
| JP | 2012-137159 | 7/2012 |
| WO | 2012-057241 | 5/2012 |

* cited by examiner

HYDRAULIC CONTROL APPARATUS AND METHOD

CROSS-REFERENCE TO RELATED APPLICATIONS

This is a continuation of International Application No. PCT/JP2012/070388, filed on Aug. 9, 2012, which is based upon and claims the benefit of priority of the prior Japanese Patent Application No. 2011-206441, filed on Sep. 21, 2011, the entire contents of which are hereby incorporated by reference.

FIELD

The disclosure is related to a hydraulic control apparatus and a method that controls a hydraulic pump in a construction machine in which a hydraulic actuator is connected to the hydraulic pump via a directional control valve of a closed center type, and in which a position of the directional control valve is changed according to an operation amount of an operation member.

BACKGROUND

A control method for a variable volume pump is known in which, instead of an ordinary bleed control for controlling a hydraulic actuator speed by changing a bleed flow rate according to an operation amount of a control valve, a directional control valve of a closed center type is used, while a virtual bleed opening is set in the control valve and an area of the bleed opening (virtual bleed opening area) is changed according to the operation amount. According to the control method, a necessary pump discharge pressure is calculated using the virtual bleed opening area and a virtual bleed amount derived therefrom to perform the pump control such that the pump discharge pressure is implemented.

However, because only the virtual bleed opening is set and a negative control restriction is not assumed, a virtual negative control system is not replicated. As is generally known, the negative control system is in touch with human sensibilities, because the speed of the hydraulic actuator is low when a load is high while the speed of the hydraulic actuator is high when the load is low.

SUMMARY

According to an aspect of the disclosure, a hydraulic control apparatus is provided which controls a hydraulic pump in a construction machine in which a hydraulic actuator is connected to the hydraulic pump via a directional control valve of a closed center type, and in which a position of the directional control valve is changed according to an operation amount of an operation member, the hydraulic control apparatus comprising:

a virtual negative control pressure calculating part configured to calculate, based on the operation amount of the operation member and a discharge pressure of the hydraulic pump, a virtual negative control pressure when a negative control system is assumed; and a part configured to calculate a control command value for the hydraulic pump based on the virtual negative control pressure.

DESCRIPTION OF EMBODIMENTS

In the following, embodiments will be described with reference to the accompanying drawings.

Figure 1:
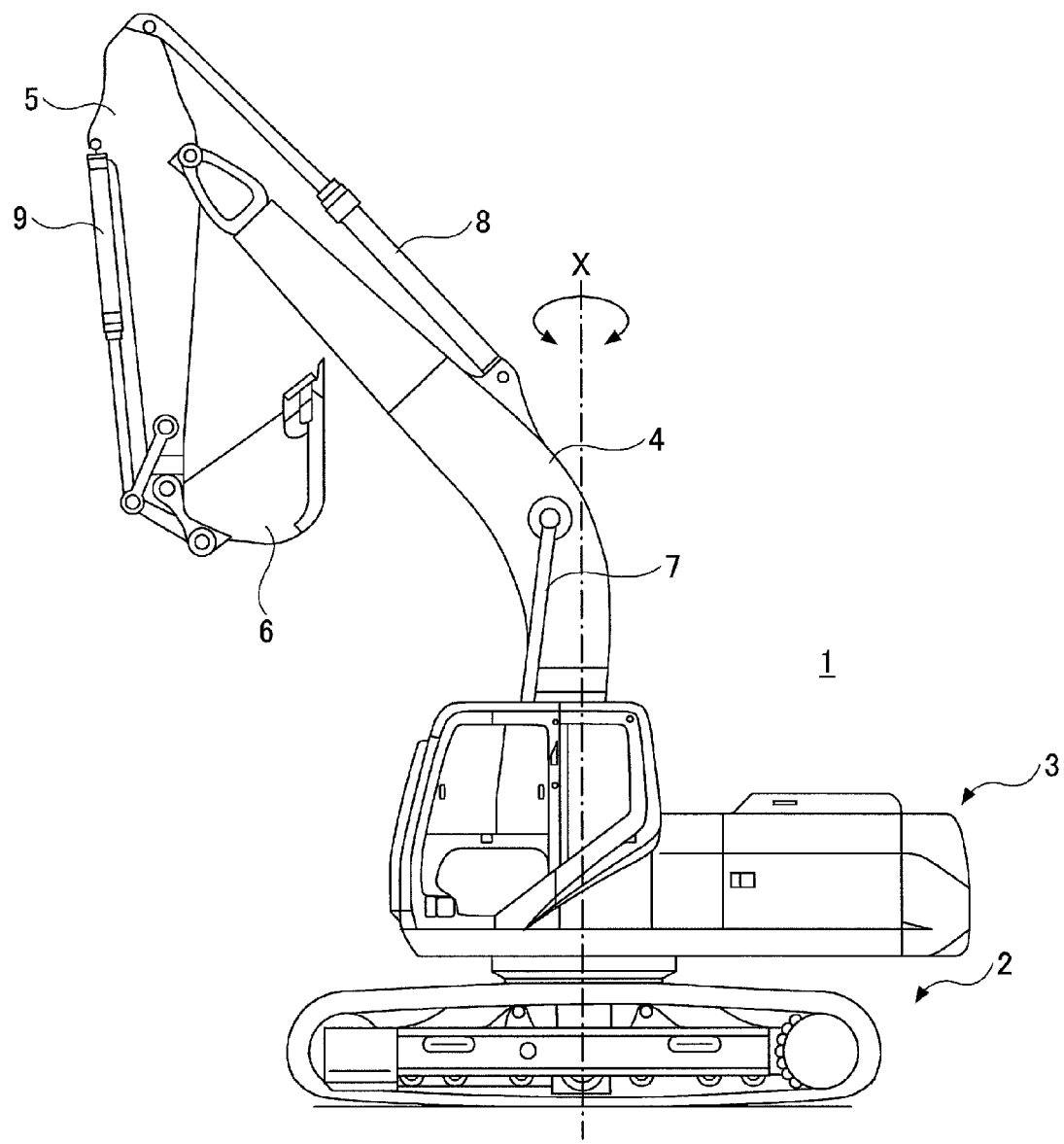
FIG. 1 is a diagram for illustrating an example of a configuration of a construction machine 1 according to an embodiment of the present invention.

FIG. 1 is a diagram for illustrating an example of a configuration of a construction machine 1 according to an embodiment of the present invention. The construction machine 1 is a machine that has a hydraulic system operated by a human installed thereon, such as a hydraulic shovel, a folk lift, a crane. In FIG. 1, the construction machine 1 includes an upper rotating body 3 mounted on a lower traveling body of a crawler type via a rotating mechanism such that the upper rotating body 3 is rotatable around an X axis. Further, the upper rotating body 3 includes an excavation attachment at a forward center thereof that includes a boom 4, an arm 5 and a bucket 6 as well as a boom cylinder 7, an arm cylinder 8 and a bucket cylinder 9 as hydraulic actuator for driving them, respectively. The excavation attachment may be another attachment such as a breaker, a crusher, etc.

Figure 2:
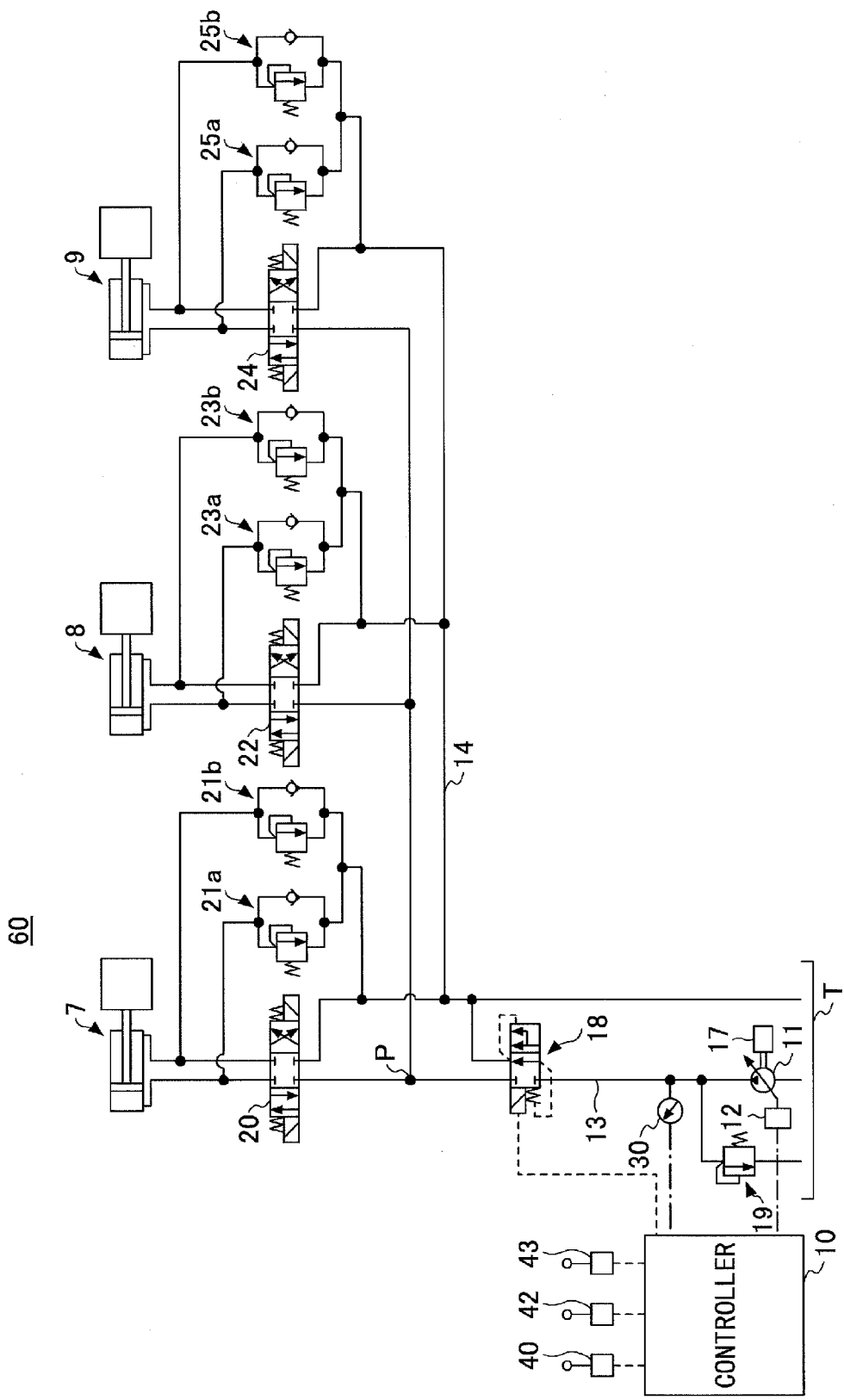
FIG. 2 is a diagram for illustrating a hydraulic circuit of a hydraulic control system 60 according to the embodiment.

FIG. 2 is a diagram for illustrating a hydraulic circuit of a hydraulic control system 60 according to the embodiment. The hydraulic control system 60 includes a hydraulic pump 11 of a variable volume type with which a discharge amount per a revolution (cc/rev) is variable. The hydraulic pump 11 is connected to an engine 17 and driven to rotate by the engine 17. The hydraulic pump 11 is connected to the boom cylinder 7, the arm cylinder 8 and the bucket cylinder 9

(examples of the hydraulic actuator) via a supply line 13 and directional control valves of a closed center type (control valves) 20, 22 and 24 in parallel. Further, a return line 14, which is connected to a tank T, is connected to the boom cylinder 7, the arm cylinder 8 and the bucket cylinder 9 via the control valves 20, 22 and 24. The hydraulic pump 11 is controlled by a regulator apparatus 12. It is noted that the control valves 20, 22 and 24 may be of a type in which a position control is hydraulically performed or a type in which a position control is electronically performed with an electric signal (drive signal) from the controller 10 as illustrated.

It is noted that the hydraulic control system 60 may include another actuator such as a hydraulic motor for traveling and a hydraulic motor for rotating. Further, the number of the hydraulic actuators is three in the example illustrated in FIG. 2; however, the number of the hydraulic actuators may be arbitrary including 1.

An oil pressure sensor 30 for detecting a discharge pressure (pump discharge pressure) of the hydraulic pump 11 is provided in the hydraulic line from the hydraulic actuator 11. The pressure sensor 30 may input an electrical signal according to the pump discharge pressure to the controller 10.

An unloading valve 18 is provided in the supply line 13. The unloading valve 18 is connected to the return line 14 connecting to the tank T. In this way, the supply line 13 is in fluid communication with the tank T via the unloading valve 18. The unloading valve 18 switches, according to the position thereof, between a state in which the supply line 13 is in fluid communication with the tank T and a state in which the supply line 13 is disconnected from the tank T. The unloading valve 18 may be controlled according to open/closed states of fluid paths in the control valves 20, 22 and 24 to the respective actuators (the boom cylinder 7, the arm cylinder 8 and the bucket cylinder 9). For example, the unloading valve 18 may be closed when at least one of the actuator lines in the control valves 20, 22 and 24 is open such that the oil discharged from the hydraulic pump 11 is not discharged to the tank T. On the other hand, the unloading valve 18 may be opened when all the actuator lines in the control valves 20, 22 and 24 are closed to form such a state in which the oil discharged from the hydraulic pump 11 is discharged to the tank T. It is noted that the unloading valve 18 may be of a type in which a position control is hydraulically performed or of a type in which a position control is electronically performed with an electric signal as illustrated.

Further, a relief valve 19 is provided in the supply line 13. Further, the return line 14 is connected to head sides and rod sides of the boom cylinder 7, the arm cylinder 8 and the bucket cylinder 9 via corresponding relief valves 21a, 21b, 23a, 23b, 25a and 25b. It is noted that, in the illustrated example, the relief valves 21a, 21b, 23a, 23b, 25a and 25b include supplementary feed check valves. The relief valves 21a, 21b, 23a, 23b, 25a and 25b may be of a type in which a position control is hydraulically performed or of a type in which a position control is electronically performed with an electric signal as illustrated.

The controller 10 mainly includes a microprocessor that includes a CPU, a ROM in which control programs are stored, a RAM in which calculation results are stored, a timer, a counter, an input interface, an output interface, etc., for example.

Operation members 40, 42 and 43 are electrically connected to the controller 10. The operation members 40 and 42 are to be operated by a user for changing the positions of the control valves 20, 22 and 24 to operate the construction machine 1. The operation members 40 and 42 may be in a form of a lever or a pedal, for example. In this example, the operation members 40, 42 and 43 are an arm operation lever for operating the arm 5, a boom operation lever for operating the boom 4, and a bucket operation lever for operating the bucket 6, respectively. Operation amounts (strokes) of the operation members 40, 42 and 43 by the user is input to the controller 10 as electric signals. A way of detecting the operation amounts of the operation members 40, 42 and 43 by the user may be a way of detecting pilot pressures with pressure sensors or a way of detecting lever angles.

The controller 10 controls the control valves 20, 22 and 24 and the unloading valve 18 based on the operation amounts of the operation members 40, 42 and 43, etc. It is noted that if the control valves 20, 22 and 24 are of a type in which a position control is hydraulically performed, the control valves 20, 22 and 24 are controlled directly by the pilot pressures that are changed according to the operations of the operation members 40, 42 and 43. Thus, when the arm operation amount LS1, the boom operation amount LS2 and the bucket operation amount LS3 are less than or equal to corresponding predetermined thresholds $LS_{th1}$, $LS_{th2}$ and $LS_{th3}$, respectively, the unloading valve 18 may be opened, but when at least one of the arm operation amount LS1, the boom operation amount LS2 and the bucket operation amount LS3 is greater than the corresponding predetermined thresholds $LS_{th1}$, $LS_{th2}$ or $LS_{th3}$, the unloading valve 18 may be closed. The predetermined thresholds $LS_{th1}$, $LS_{th2}$ and $LS_{th3}$ may correspond to the operation amounts when the actuator lines of the directional control valves 20, 22 and 24 start to open.

Further, the controller 10 controls the hydraulic pump 11 via the regulator apparatus 12 based on the operation amounts of the operation members 40, 42 and 43, etc. It is noted that a method of controlling the hydraulic pump 11 is described hereinafter in detail.

Next, features of a control method by the controller 10 according to the embodiment is described.

The controller 10 according to the embodiment replicates control characteristics of an open center type (negative control system) in the hydraulic circuit including the control valves 20, 22 and 24 of a closed center type illustrated in FIG. 2. Such a system is referred to as "a virtual bleed system" hereinafter.

Figure 3:
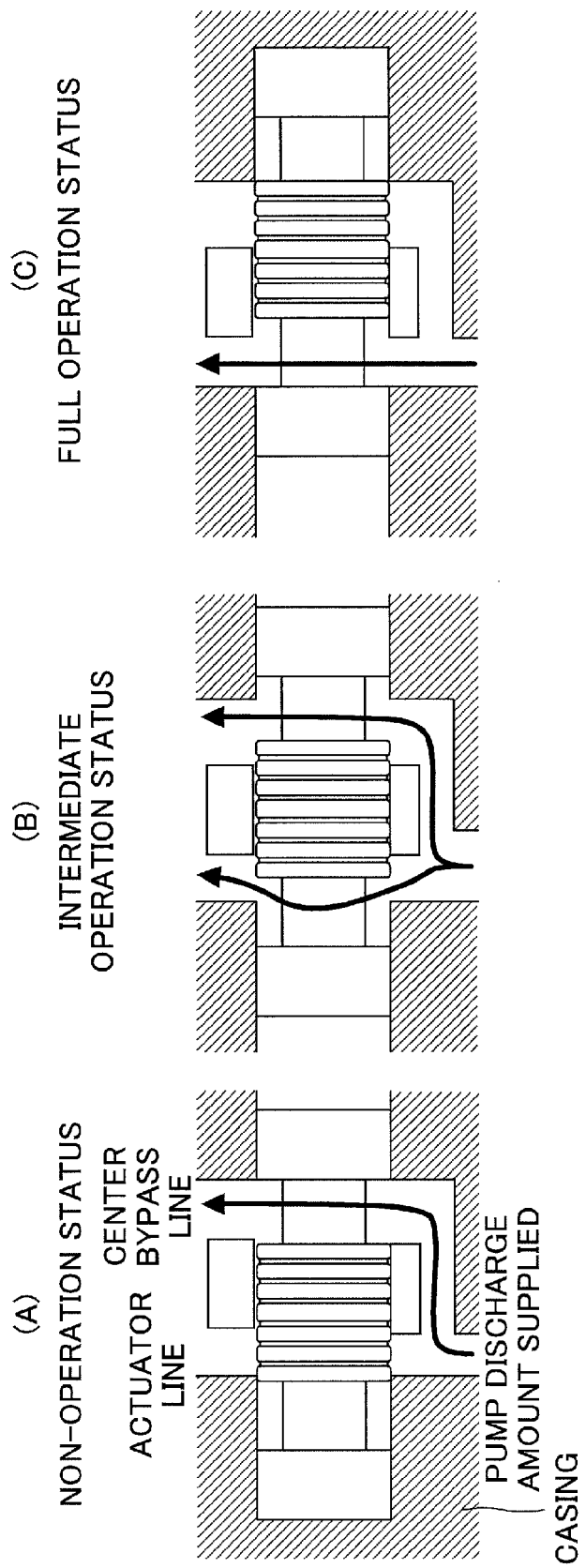
FIG. 3 is a diagram for schematically illustrating a directional control valve used in a (negative control) system of an open center type.

FIG. 3 is a diagram for schematically illustrating a directional control valve used in a (negative control) system of an open center type. In the negative control system, when the directional control valve is in its nominal state, an overall discharge flow rate of the hydraulic pump is unloaded to the tank via a center bypass line, as illustrated in FIG. 3 (A). For example, when the directional control valve is moved to the right side by the operation of the operation member, the flow path to the hydraulic actuator is opened and the center bypass line is narrowed. In the fully operated state, the center bypass line is fully closed such that the overall discharge flow rate of the hydraulic pump is supplied to the hydraulic actuator, as illustrated in FIG. 3 (C). These relationships can be expressed as follow.

$$Q_d = c_a A_a \sqrt{\frac{2(p_d - p_{act})}{\rho}} + c_b A_b \sqrt{\frac{2p_d}{\rho}} \qquad \text{[formula 1]}$$

$\rho$ is a density, $Q_d$ and $p_d$ are discharge flow rate and discharge pressure of the hydraulic pump, $c_b$ and $A_b$ are a flow coefficient and an opening area (bleed opening area) in the directional control valve related to the center bypass line, $c_a$ and $A_a$ are a flow coefficient and an opening area in the directional control valve related to the actuator line, and $p_{act}$ is a actuator line pressure. In the negative control system, the center bypass line has a negative control restriction downstream from the directional control valve to be in fluid communication with the tank via the negative control restriction (see FIG. 7).

As is clear from the formula 1, when the actuator line pressure increases due to the increased load, a differential pressure ($p_d - p_{act}$) decreases, and thus the flow rate to the hydraulic actuator decreases. If the discharge flow rate $Q_d$ from the hydraulic pump is the same, the flow rate through the center bypass line is decreased. This means that the hydraulic actuator speed differs according to the load of the hydraulic actuator even at the same operation amount.

Figure 4:
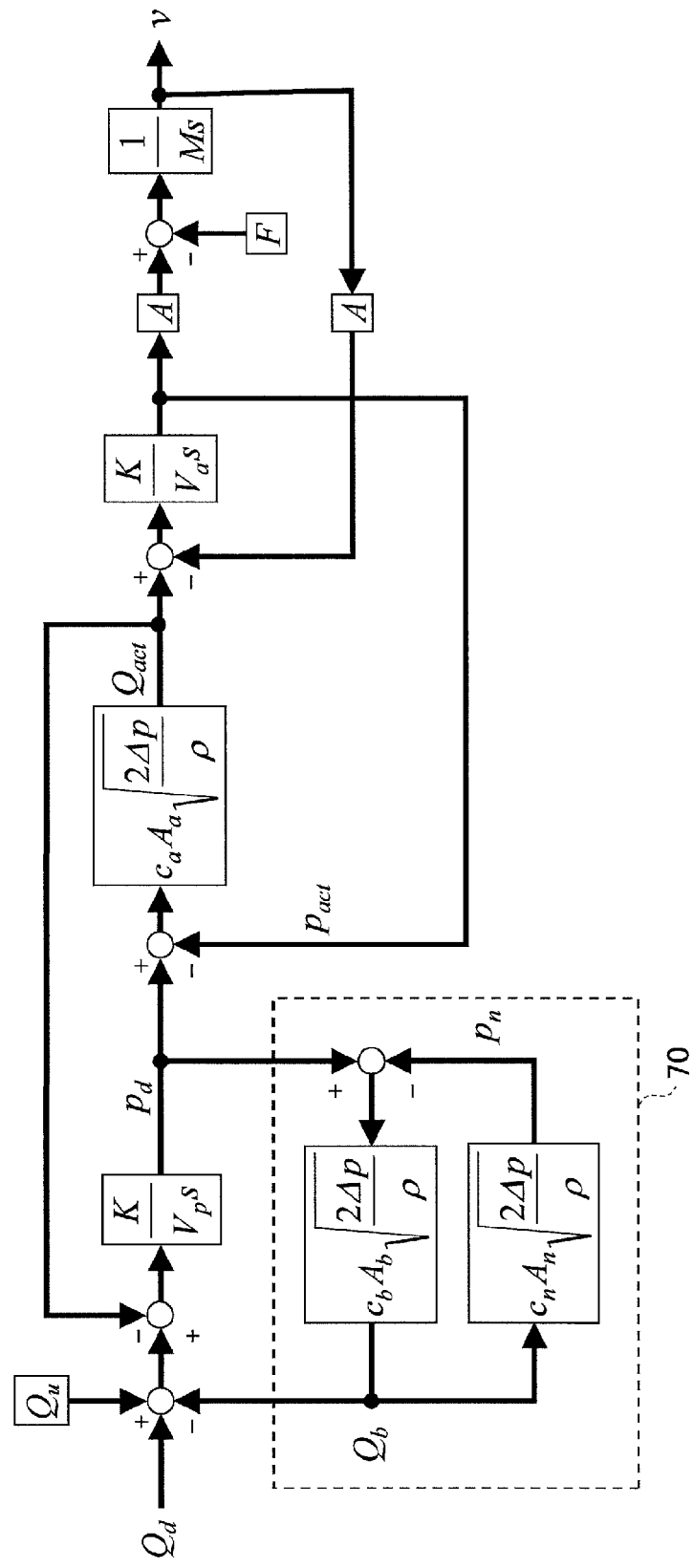
FIG. 4 is a block diagram for illustrating a negative control system that is replicated in a virtual bleed system implemented by a controller 10 according to the embodiment.

FIG. 4 is a block diagram for illustrating a negative control system that is replicated in a virtual bleed system implemented by a controller 10 according to the embodiment. It is noted that, in FIG. 4, $Q_b$ is a flow rate flowed through the unloading valve, K is a modulus of elasticity of volume, $V_p$ is a pump-control valve volume, $V_a$ is a control valve-cylinder volume, A is a cylinder pressure applied area, M is a cylinder volume, and F is a disturbance.

According to the embodiment, in order to replicate the negative control system in the virtual bleed system, a directional control valve of a closed center type (see FIG. 3) is assumed as indicated by a block 70 in FIG. 4, a bleed part at this virtual directional control valve is calculated to calculate a virtual bleed amount $Q_b$, and a target value $Q_{dt}$ of the discharge amount of the hydraulic pump based on a control rule of the negative control system is subtracted the virtual bleed amount $Q_b$ to generate an command value to control the hydraulic pump 11.

The virtual, bleed amount $Q_b$ may be calculated as follow, considering a fact that there is a back pressure in the center bypass line due to the negative control restriction in the actual negative control system. In other words, in the virtual bleed system, in order to model the actual negative control system, it is assumed that the negative control restriction is provided in the center bypass line from the virtual directional control valve, and the back pressure due to the negative control restriction may be considered.

$$Q_b = c_b A_b \sqrt{\frac{2(p_d - p_n)}{\rho}} \quad \text{[formula 2]}$$

$p_n$ is a back pressure (referred to as "virtual negative control pressure" hereinafter) due to the negative control restriction.

On the other hand, at a virtual negative control restriction, the following equation holds.

$$Q_b = c_n A_n \sqrt{\frac{2(p_n - p_t)}{\rho}} = c_n A_n \sqrt{\frac{2 p_n}{\rho}} \quad \text{[formula 3]}$$

$P_t$ is a tank pressure and 0 in this example. A predetermined upper limit $p_{nmax}$ is set for the virtual negative control pressure $p_n$. The virtual negative control pressure $p_n$ may correspond to a setting pressure of the relief valve in the assumed negative control system.

The virtual negative control pressure $p_n$ can be expressed from the formula 2 and the formula 3 as follow.

$$p_n = \frac{(c_b A_b)^2}{(c_b A_b)^2 + (c_n A_n)^2} p_d \quad \text{[formula 4]}$$

From the formula 4, it can be seen that the virtual negative control pressure $p_n$ can be calculated from the discharge pressure $p_d$ of the hydraulic pump 11 based on a flow coefficient $c_b$ and an opening area $A_b$ in the directional control valve related to the center bypass line, and a flow coefficient $c_n$ and an opening area $A_n$ at the negative control restriction. The flow coefficient $c_b$, the opening area $A_b$, the flow coefficient $c_n$ and the opening area $A_n$ can be initially set to virtual values (thus, these are known values). The flow coefficient $c_n$ and the opening area $A_n$ are based on the assumed characteristics of the negative control restriction. An example of a characteristic of the opening area $A_b$ is described hereinafter.

In this way, even without an actual bleed opening (i.e., even without a center bypass line nor a negative control restriction), the virtual negative control pressure $p_n$ can be calculated from the discharge pressure $p_d$ of the hydraulic pump 11 (a detection value of the oil pressure sensor 30, for example) based on the assumed characteristics of the negative control system (the flow coefficient $c_b$, the opening area $A_b$, the flow coefficient $c_n$ and the opening area $A_n$), and the discharge flow rate of the hydraulic pump 11 can be controlled based on the virtual negative control pressure $p_n$. In other words, the negative control system can be replicated by controlling the discharge flow rate of the hydraulic pump 11 such that the virtual negative control pressure $p_n$ is treated as a negative control pressure to be obtained in the negative control system.

Figure 5:
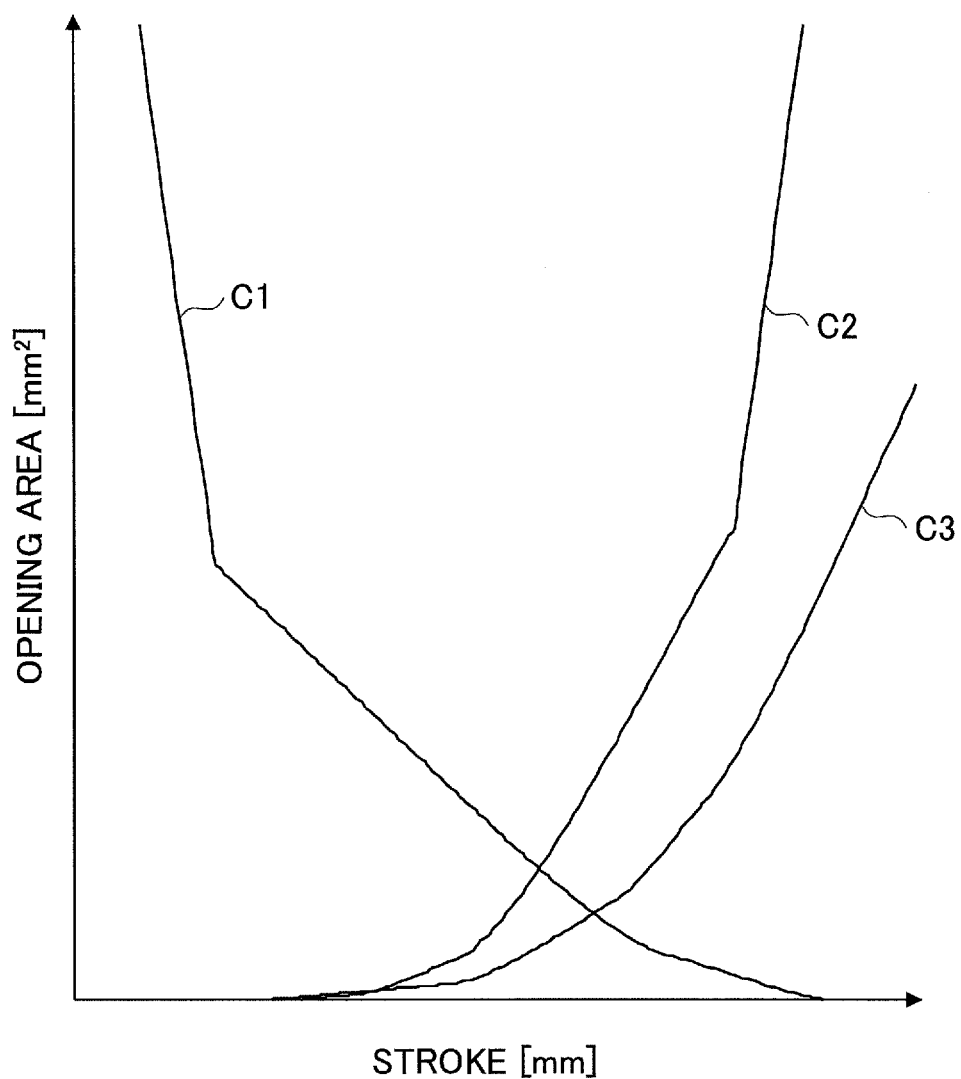
FIG. 5 is a diagram for illustrating an example of characteristics of a virtual directional control valve and a directional control valve.

FIG. 5 is a diagram for illustrating an example of characteristics of a virtual directional control valve and a directional control valve. Specifically, a characteristic C1 is a curve that represents a relationship between the operation amount (stroke) in the virtual directional control valve and the opening area (virtual bleed opening area) $A_b$. A characteristic C2 indicates an opening characteristic on a meter-in side in the directional control valve, and a characteristic C3 indicates an opening characteristic on a meter-out side in the directional control valve. A table that represents the characteristic C1 is prepared for each of the directional control valves 20, 22 and 24 as bleed opening data tables.

Figure 6:
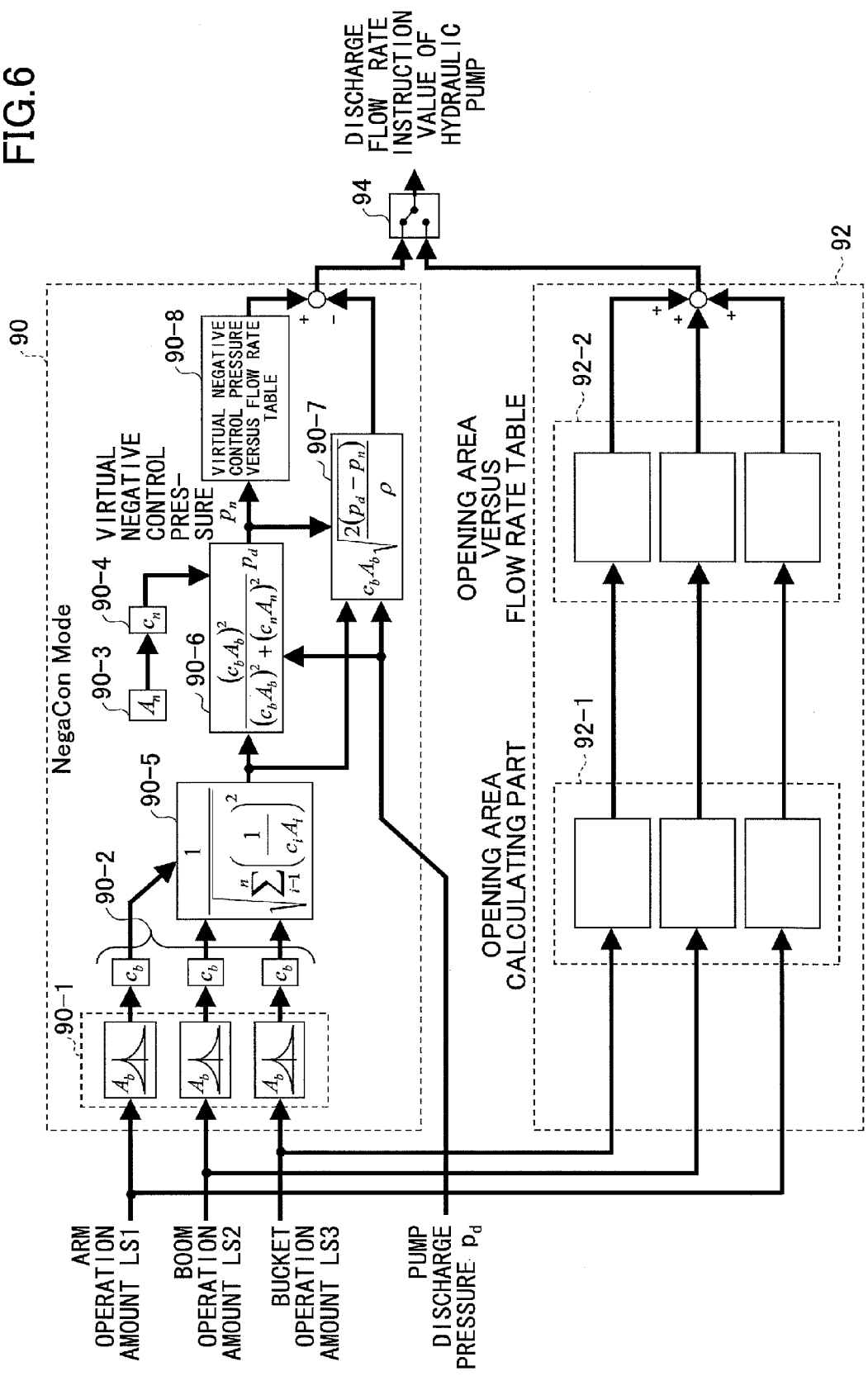
FIG. 6 is a block diagram for illustrating an example of a virtual bleed system implemented by a controller 10 according to the embodiment.

FIG. 6 is a block diagram for illustrating an example of a virtual bleed system implemented by a controller 10 according to the embodiment. It is noted that in the following such a configuration in which a positive control system and the negative control system are selectively implemented; however, only the negative control system may be implemented in the virtual bleed system. It is noted that the negative control system corresponds to a block 90 in FIG. 6 and the positive control system corresponds to a block 92 in FIG. 6. A control block of the positive control system is the same as an ordinary positive control system, and thus a control block of the negative control system, in particular, is described hereinafter. It is noted that the block 90 in FIG. 6 corresponds to a part of the block 70 in FIG. 4.

Figure 7:
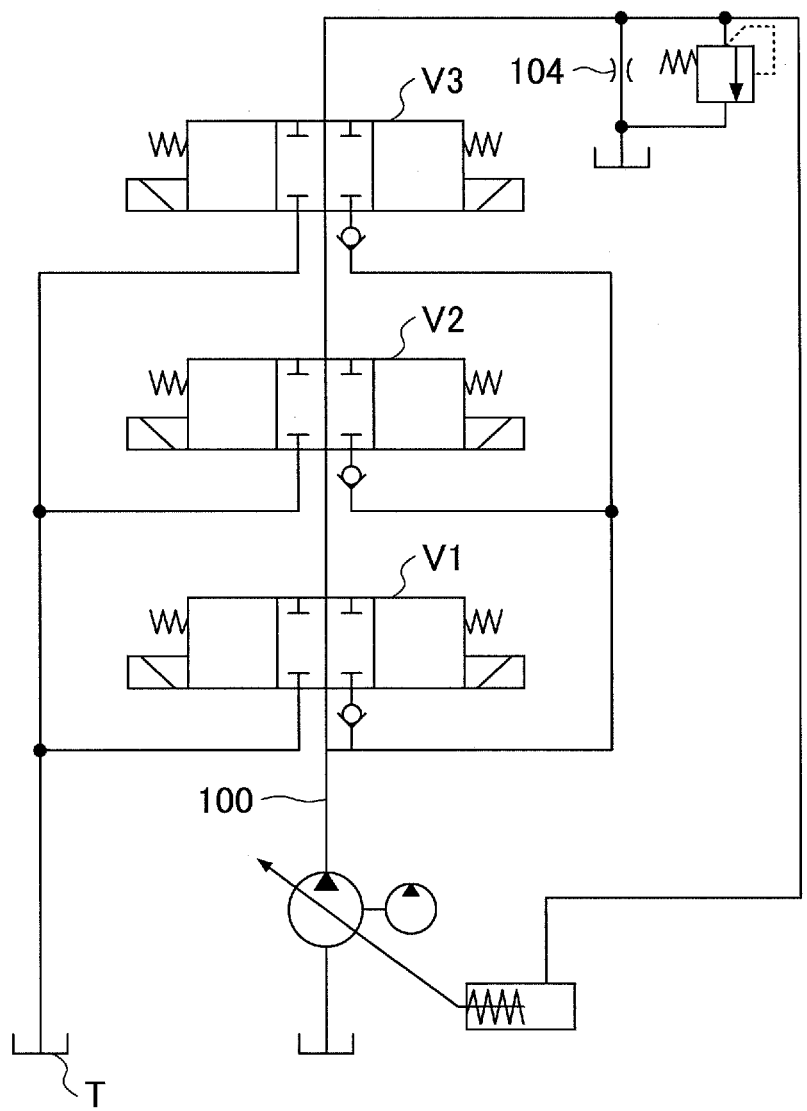
FIG. 7 is a diagram for schematically illustrating an example of a negative control system replicated by the virtual bleed system.

In this virtual bleed system, as an example, such a negative control system as illustrated in FIG. 7 is replicated. In this negative control system, directional control valves V1, V2 and V3 of an open center type (corresponding to the virtual directional control valves in the virtual bleed system)

that correspond to the directional control valves 20, 22 and 24 of a closed center type, respectively, are connected in series, and a negative control restriction 104 (corresponding to the virtual negative control restriction in the virtual bleed system) is disposed on a downstream side of a center bypass line 100. It is noted that in FIG. 7 the illustration of the hydraulic actuators (the boom cylinder 7, the arm cylinder 8 and the bucket cylinder 9) which are provided for the corresponding directional control valves V1, V2 and V3 is omitted.

As illustrated in FIG. 6, signals representing the operation amounts of the operation members 40, 42, that is to say, an arm operation amount LS1, a boom operation amount LS2 and a bucket operation amount LS3 are input to the blocks 90 and 92 of the negative and positive systems. Further, the discharge pressure $p_d$ of the hydraulic pump 11 (merely referred to as "pump discharge pressure $p_d$" hereinafter) are input to the blocks 90 and 92 of the negative and positive systems. It is noted that the pump discharge pressure $p_d$ may be a detection value of the oil pressure sensor 30.

The arm operation amount LS1, the boom operation amount LS2 and the bucket operation amount LS3 are converted to the opening areas $A_b$ at the corresponding bleed opening data tables (see FIG. 5) 90-1, respectively, and multiplied by corresponding flow coefficients $c_b$ to be input to a block 90-5. The block 90-5 calculates a parameter $c_e A_e$ of the virtual directional control valves as a whole based on a fact that an equivalent opening area $A_e$ of restrictions connected in series can be expressed as follow.

$$A_e = \frac{1}{\sqrt{\sum_{i=1}^{n}\left(\frac{1}{A_i}\right)^2}} \quad \text{[formula 5]}$$

$A_i$ corresponds to virtual bleed opening areas of the respective virtual directional control valves (i.e., the respective virtual directional control valves corresponding to the directional control valves 20, 22 and 24). When the flow coefficients are additionally considered, the following formula is given.

$$c_e A_e = \frac{1}{\sqrt{\sum_{i=1}^{n}\left(\frac{1}{c_i A_i}\right)^2}} \quad \text{[formula 6]}$$

$c_i$ corresponds to flow coefficients of the respective virtual directional control valves (i.e., the respective virtual directional control valves corresponding to the directional control valves 20, 22 and 24). It is noted that i corresponds to the number of the directional control valves (and thus the number of the hydraulic actuators). For example, in the case of a configuration in which only the directional control valve 20 exists, the sigma in the formula is not used (i.e., the product of the flow coefficient c and the opening area A related to the directional control valve 20 is merely calculated).

$c_e A_e$ thus obtained is input to a block 90-6. $A_n c_n$ and the pump discharge pressure $p_d$ are also input to the block 90-6. $A_n c_n$ are obtained by multiplying the opening area $A_n$ at the virtual negative control restriction by the flow coefficient $c_n$ at the virtual negative control restriction, and are input from blocks 90-3 and 90-4. In a bock 90-6, the virtual negative control, pressure $p_n$ is calculated based on the formula 4 described above. The virtual negative control pressure $p_n$ thus calculated is input to blocks 90-7 and 90-8.

Figure 8:
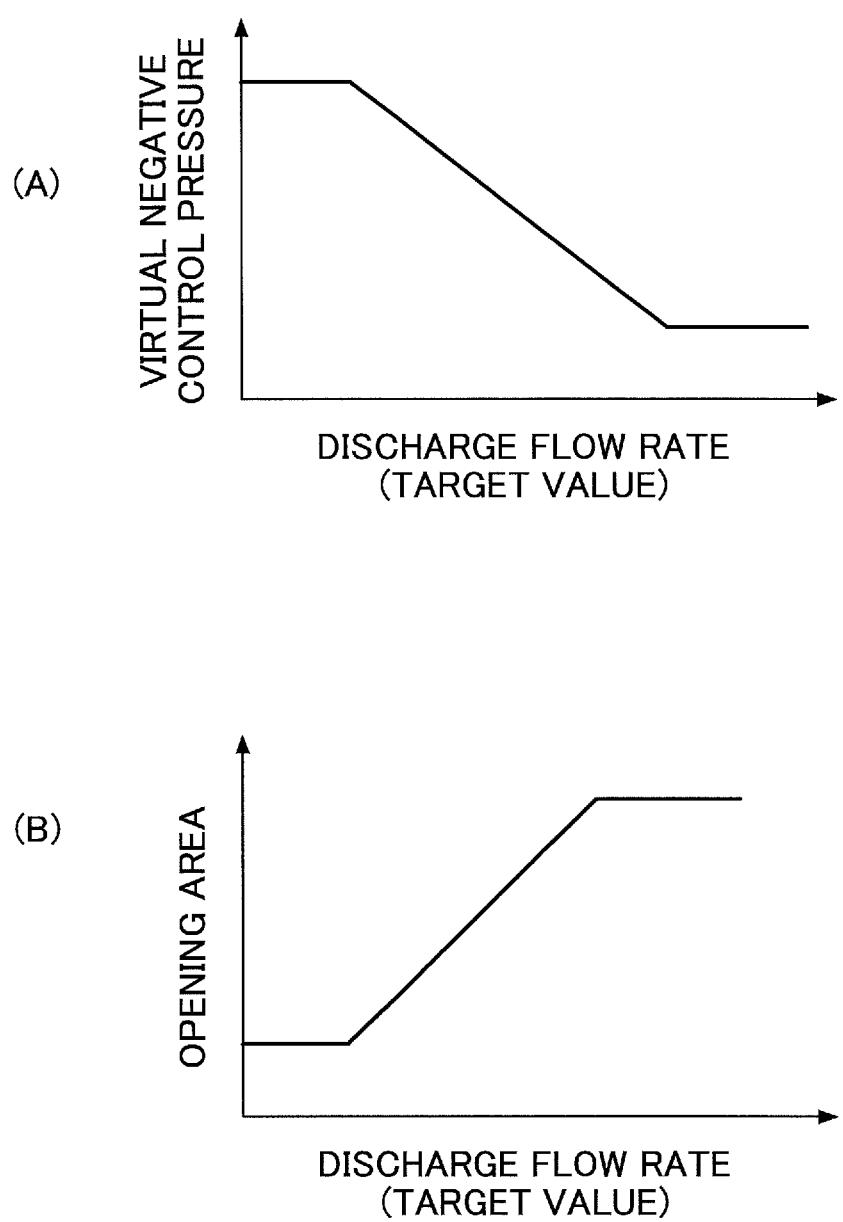
FIG. 8 is a diagram for illustrating examples of a virtual negative control pressure versus flow rate table and a opening area versus flow rate table.

In a block 90-7, the virtual bleed amount $Q_b$ is calculated from the pump discharge pressure $p_d$ and the virtual negative control pressure $p_n$ based on the formula 2 described above. In a block 90-8, the target value $Q_{dt}$ of the discharge flow rate of the hydraulic pump 11 is calculated from the virtual negative control pressure $p_n$ based on a given a virtual negative control pressure versus flow rate table (see FIG. 8 (A)). The target value $Q_{dt}$ of the discharge flow rate of the hydraulic pump 11 is determined based on a control rule of the negative control system. Specifically, the virtual negative control pressure versus flow rate table represents a relationship between the virtual negative control pressure $p_n$ and the target value $Q_{dt}$ of the discharge flow rate of the hydraulic pump 11, and this relationship may be determined based on the assumed control rule of the negative control system. The virtual negative control pressure versus flow rate table illustrated in FIG. 8 (A) has such a relationship that the target value $Q_{dt}$ of the discharge flow rate becomes small when the virtual negative control pressure $p_n$ is high while the target value $Q_{dt}$ of the discharge flow rate becomes great when the virtual negative control pressure $p_n$ is low. According to the virtual bleed system, the virtual bleed amount $Q_b$ is redundant unlike the actual negative control system, and thus the virtual bleed amount $Q_b$ is subtracted from the target value $Q_{dt}$ of the discharge flow rate of the hydraulic pump 11 to calculate an command value (virtual negative control target value) of the discharge flow rate of the hydraulic pump 11. It is noted that a maximum flow rate (horsepower control target value) for a horsepower control is calculated based on an engine rpm and a setting torque, and the smaller of the virtual negative control target value and the horsepower control target value is selected as a final target value, although it is not illustrated.

It is noted that the mode selector 94 switches between a positive control mode for implementing the positive control system and a negative control mode for implementing the negative control system. The mode selector 94 may switch the mode according to the operation of the user or may automatically switch the mode according to a predetermined condition. It is noted that in the positive control mode, the opening area of the actuator line is calculated based on the arm operation amount LS1, the boom operation amount LS2 and the bucket operation amount LS3 in a block 92-1, and command values (positive control target value) of actuator demand flow rates of the hydraulic actuators is calculated based on an opening area versus flow rate table (see FIG. 8 (B)) that represents a relationship between the opening area and the actuator demand flow rate in a block 92-2. It is noted that the actuator demand flow rates of the hydraulic actuators may be calculated directly from an operation amount versus flow rate table based on the arm operation amount LS1, the boom operation amount LS2 and the bucket operation amount LS3. Further, as is the case with the virtual negative control target value, a maximum flow rate (horsepower control target value) for a horsepower control is calculated based on an engine rpm and a setting torque, and the smaller of the positive control target value and the horsepower control target value is selected as a final target value.

In this way, by setting the mode selector 94, it becomes possible to selectively use the positive control system that enables a precise operation or the negative control target value that is in touch with human sensibilities, if necessary.

According to the hydraulic control apparatus of the present embodiment described above, the following effect among others can be obtained.

As is described above, because the directional control valves 20, 22 and 24 of a closed center type are used, bleeding, which is necessary in the case of the negative control system, becomes unnecessary, which enhances energy conservation. Further, the characteristics of the directional control valve are based on electronic data and thus can be easily changed. Therefore, it becomes possible to easily adjust the characteristics of the directional control valve (the characteristic of the virtual bleed opening area, in particular, see the characteristic C1 in FIG. 5. This holds true for the characteristics of the negative control restriction. Further, because the directional control valves 20, 22 and 24 of a closed center type are used, bleed lines for the directional control valves become unnecessary, which reduces cost of the directional control valves.

In the virtual bleed system described above, it is preferred in terms of the control principle that the oil pressure sensor 30 is provided near (immediately before) the directional control valves 20, 22 and 24. However, such an arrangement of the directional control valves 20, 22 and 24 may not be implemented due to mechanically available space, cost, etc. For example, there is a case where the oil pressure sensor 30 is provided in the hydraulic pump 11. In such a case, the pump discharge pressure detected by the oil pressure sensor 30 corresponds to a pressure after pressure loss due to pipe resistance in a section from the hydraulic pump 11 to the directional control valves 20, 22 and 24 has been added. For this reason, preferably, an real pressure added to the directional control valves 20, 22 and 24 is predicted by referring to the command value for the discharge flow rate of the hydraulic pump 11 to previously add a gain or bias to the pump discharge pressure detected by the oil pressure sensor 30. As a result of this, even if the oil pressure sensor 30 is not disposed near the directional control valves 20, 22 and 24, the virtual negative control pressure, which is adapted to an actual negative control pressure with high accuracy, can be calculated by predicting the real pressure added to the directional control valves 20, 22 and 24, which enhances the reproducibility of the negative control system in the virtual bleed system.

More preferably, a change in a viscosity of the oil due to a secular variation of the oil or increased leakage loss of the hydraulic pump 11 due to a secular variation of apparatuses (and thus the command value cannot be implemented) are considered to be compensated for.

Specifically, the problem related to the change in the viscosity of the oil may be solved by providing the unloading valve 18 near (immediately before) the directional control valves 20, 22 and 24. For example, in FIG. 2, the unloading valve 18 may be provided immediately before a branch point P of the supply line 13. If possible in terms of a construction, the unloading valve 18 may be attached to a block of the directional control valve 20 that is the nearest with respect to the hydraulic pump 11. In this case, in a situation where the unloading valve 18 is operated (in its open state) and there is no restriction, the pump discharge pressure detected by the oil pressure sensor 30 substantially corresponds to the pressure loss itself in the pipe. Thus, by comparing a preset value of the pressure loss with the pump discharge pressure detected by the oil pressure sensor 30, a difference or ratio of a dynamic viscosity before and after the change can be determined. It is noted that the following Hagen-Rubens formula can be utilized for the calculation, for example. The gain or bias added to the pump discharge pressure detected by the oil pressure sensor 30 may be set according to the difference or ratio of the dynamic viscosity.

$$Q = \frac{\pi r^4}{8l\mu}\Delta p \qquad \text{[formula 7]}$$

Here, r is an inner diameter of the pipe, l is a length of the pipe, $\mu$ is a dynamic viscosity, and $\Delta p$ is a pressure difference.

Further, the problem related to the secular degradation of the hydraulic pump 11 may be solved by using the unloading valve 18 of a proportional control valve type. In this case, the pump discharge pressure is increased by applying an command value of a constant discharge flow rate to the hydraulic pump 11 to cause the hydraulic pump 11 to discharge the constant discharge flow rate and then narrowing the unloading valve 18. Because the narrowed opening position of the unloading valve 18 can be a known value, the flow rate that flows through the unloading valve 18, that is to say, the actual flow rate of the hydraulic pump 11 can be calculated from the measured pump discharge pressure from the following restriction formula (formula 8). The gain or bias for the command value of the discharge flow rate of the hydraulic pump 11 may be set based on the difference between the actual flow rate thus calculated and the command value of the discharge flow rate.

$$Q = C_u A_u \sqrt{\frac{2\Delta p}{\rho}} \qquad \text{[formula 8]}$$

$C_u$ and $A_u$ are a flow coefficient and a restriction opening position of the unloading valve 18.

In the following, concrete examples for compensating such a change in the viscosity of the oil and the secular degradation of the apparatus are described.

Figure 9:
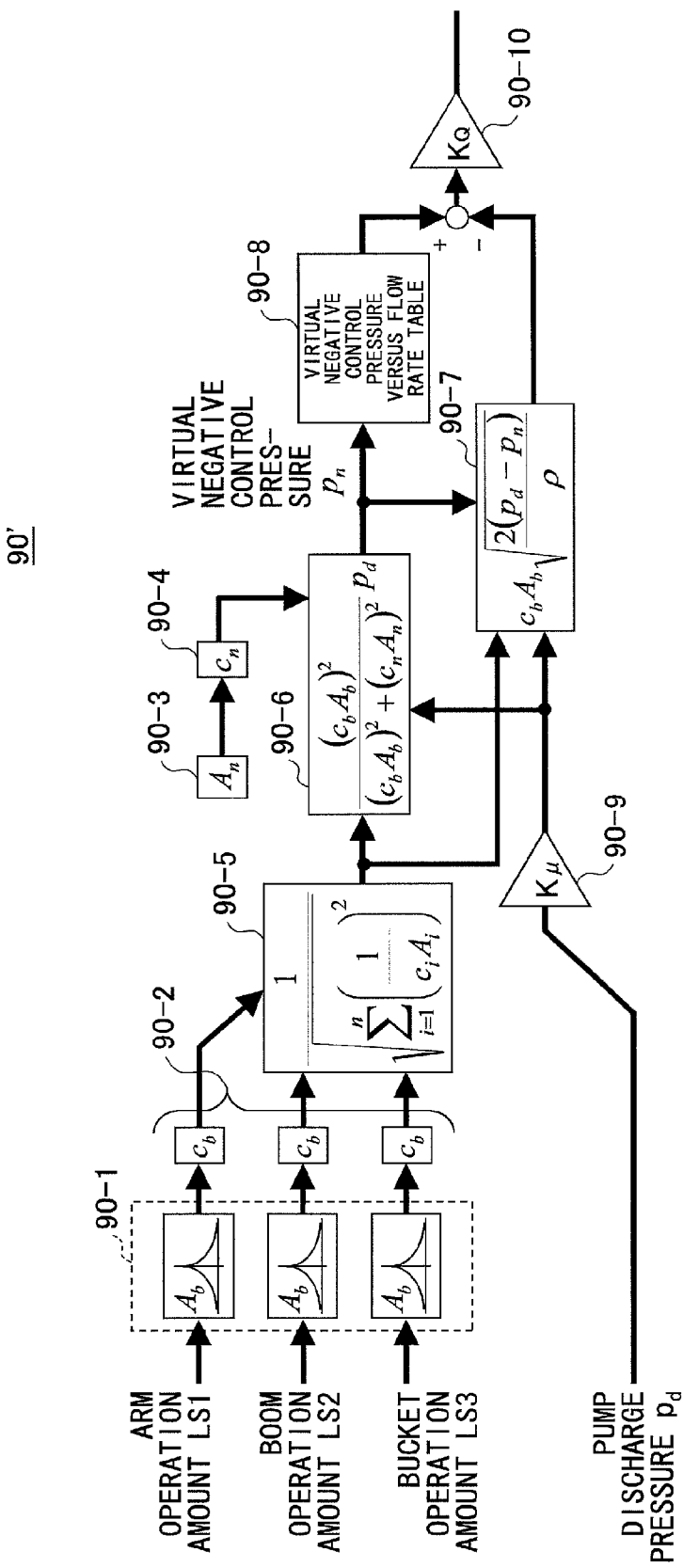
FIG. 9 is a block diagram for illustrating another example of a virtual bleed system implemented by a controller 10 according to the embodiment.

FIG. 9 is a block diagram for illustrating another example of a virtual bleed system implemented by a controller 10 according to the embodiment. In FIG. 9, unlike in FIG. 6, only a part of the negative control system is illustrated. If a configuration in which the positive control system is selectively implemented, the mode selector 94 and the block 92 of the positive control system may be added as in FIG. 6.

A block 90' of the negative control system illustrated in FIG. 9 differs from the block 90 in the example illustrated in FIG. 6 in that a block 90-9 in which the pump discharge pressure $p_d$ is multiplied by a discharge pressure adjustment gain $K_\mu$ (also referred to as a pump discharge pressure correction coefficient $K_\mu$) and a block 90-10 in which the discharge flow rate of the hydraulic pump 11 is multiplied by a discharge flow rate adjustment gain $K_Q$ (also referred to as a pump discharge instruction correction coefficient $K_Q$) are added. In the following, the difference is mainly described in detail.

Figure 10:
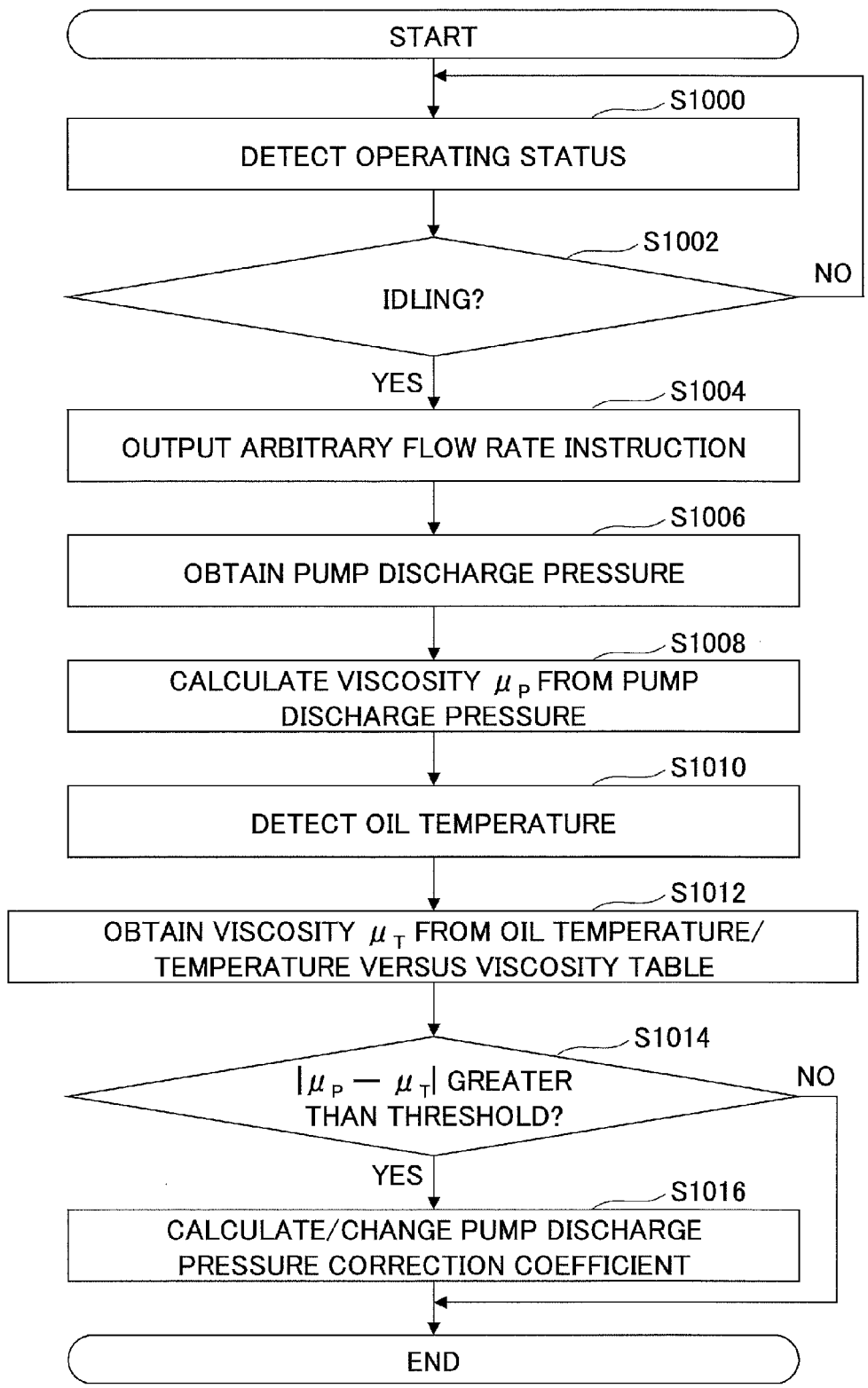
FIG. 10 is a flowchart for illustrating an example of a calculation process of a pump discharge pressure correction coefficient $K_\mu$ executed by a controller 10 according to the embodiment.
Figure 11:
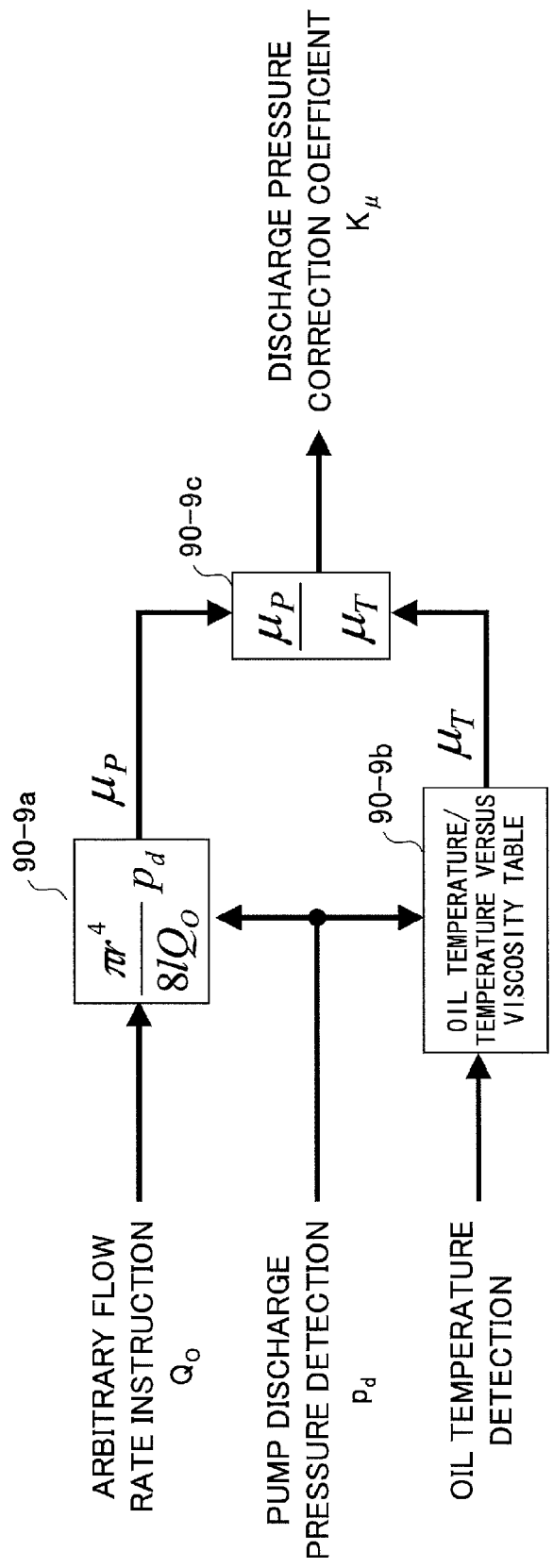
FIG. 11 is a block diagram for illustrating a calculation block of the pump discharge pressure correction coefficient $K_\mu$ related to FIG. 10.

FIG. 10 is a flowchart for illustrating an example of a calculation process of a pump discharge pressure correction coefficient $K_\mu$ executed by a controller 10 according to the embodiment. FIG. 11 is a block diagram for illustrating a calculation block of the pump discharge pressure correction coefficient $K_\mu$ related to FIG. 10.

In step 1000, an operating state of the construction machine 1 is detected.

In step 1002, it is determined whether the engine 17 is in an idle state. If the engine 17 is in an idle state, the process routine goes to step 1004. On the other hand, if engine 17 is not in an idle state, a state for waiting for the idling is formed. It is noted that, during the idling of the engine 17, the arm operation amount LS1, the boom operation amount LS2 and the bucket operation amount LS3 are 0, and the unloading valve 18 is kept in the open state (maximum opening position).

In step 1004, a predetermined command value of the discharge flow rate of the hydraulic pump 11 is calculated. The predetermined command value of the discharge flow rate of the hydraulic pump 11 may be arbitrary as long as the pump discharge pressure $p_d$ is appropriately detected in step 1006. Further, the predetermined command value of the discharge flow rate of the hydraulic pump 11 may be constant, or may increase or decrease with time (with a constant change rate, for example).

In step 1006, the pump discharge pressure $p_d$ is detected by the oil pressure sensor 30.

In step 1008, the viscosity (real viscosity) $\mu_p$ of the oil discharged from the hydraulic pump 11 is calculated (estimated) based on the predetermined command value for the discharge flow rate of the hydraulic pump 11 and the pump discharge pressure p detected by the oil pressure sensor 30. The viscosity $\mu_p$, may be calculated by using the Hagen-Rubens formula in the formula 7 (see a block 90-9a in FIG. 11). In this case, the pump discharge pressure $p_d$ detected by the oil pressure sensor 30 is substituted as the pressure difference $\Delta p$ in the formula 7. This is because the pump discharge pressure $p_d$ detected by the oil pressure sensor 30 substantially corresponds to the pressure loss itself in the pipe when the unloading valve 18 is in the open state as described above.

In step 1010, an oil temperature is detected by an oil temperature sensor (not illustrated).

In step 1012, the viscosity $\mu_T$ is calculated from a given oil temperature/temperature versus viscosity table based on the oil temperature detected by the oil temperature sensor and the pump discharge pressure $p_d$ detected by the oil pressure sensor 30. The oil temperature/temperature versus viscosity table may be generated in advance utilizing values measured in a nominal state in which there is no degradation of oil, etc. Thus, the viscosity $\mu_T$ calculated here corresponds to an intended nominal value (reference viscosity).

In step 1014, an absolute value of a difference between the viscosity $\mu_p$ calculated in step 1008 and the viscosity $\mu_T$ calculated in step 1012 is greater than or equal to a predetermined threshold. The predetermined threshold is set for determining whether the difference is great enough to be compensated for by the correction with the pump discharge pressure correction coefficient $K_\mu$ described hereinafter. The predetermined threshold may be determined according to the required accuracy of the control. If the absolute value of the difference between the viscosity $\mu_p$ and the viscosity $\mu_T$ is greater than or equal to the predetermined threshold, the process routine goes to step 1016. On the other hand, if the absolute value of the difference between the viscosity $\mu_p$ and the viscosity $\mu_T$ is smaller than the predetermined threshold, the process routine ends, determining that the correction is not necessary now.

In step 1016, the pump discharge pressure correction coefficient $K_\mu$ is calculated and the previous value is changed (updated). The ratio between the viscosity $\mu_p$ and the viscosity $\mu_T$ may be calculated as the pump discharge pressure correction coefficient $K_\mu$ ($K_\mu = \mu_p/\mu_T$) (see a block 90-9c in FIG. 11). In this way, when the conditions of step 1002 and step 1014 are met, the pump discharge pressure correction coefficient $K_\mu$ is calculated by blocks 90-9a, 9b and 9c in FIG. 11. The pump discharge pressure $p_d$ is multiplied by the pump discharge pressure correction coefficient $K_\mu$ in a block 90-9 in FIG. 9 to correct the pump discharge pressure $p_d$.

According to the configuration illustrated in FIG. 9 through FIG. 11, even if the viscosity of the oil has changed due to the secular degradation of oil, the virtual bleed system that can compensate for such a change in the viscosity can be implemented. In other words, by compensating for the change in the viscosity, the real pressure applied to the directional control valves 20, 22 and 24 can be calculated with high accuracy, which enhances the reproducibility of the negative control system in the virtual bleed system.

Figure 12:
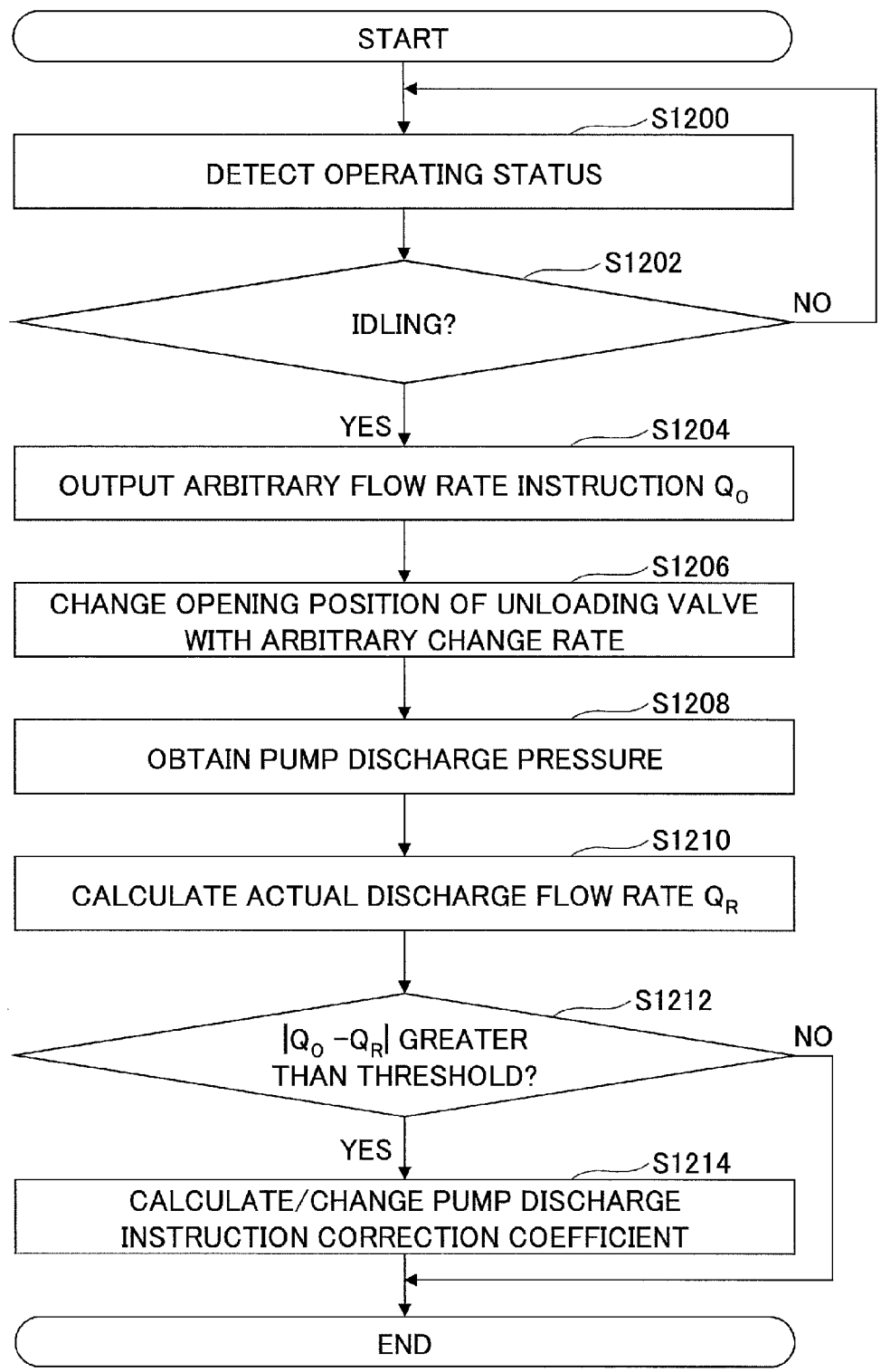
FIG. 12 is a flowchart for illustrating an example of a calculation process of a pump discharge instruction correction coefficient $K_Q$ executed by a controller 10 according to the embodiment.
Figure 13:
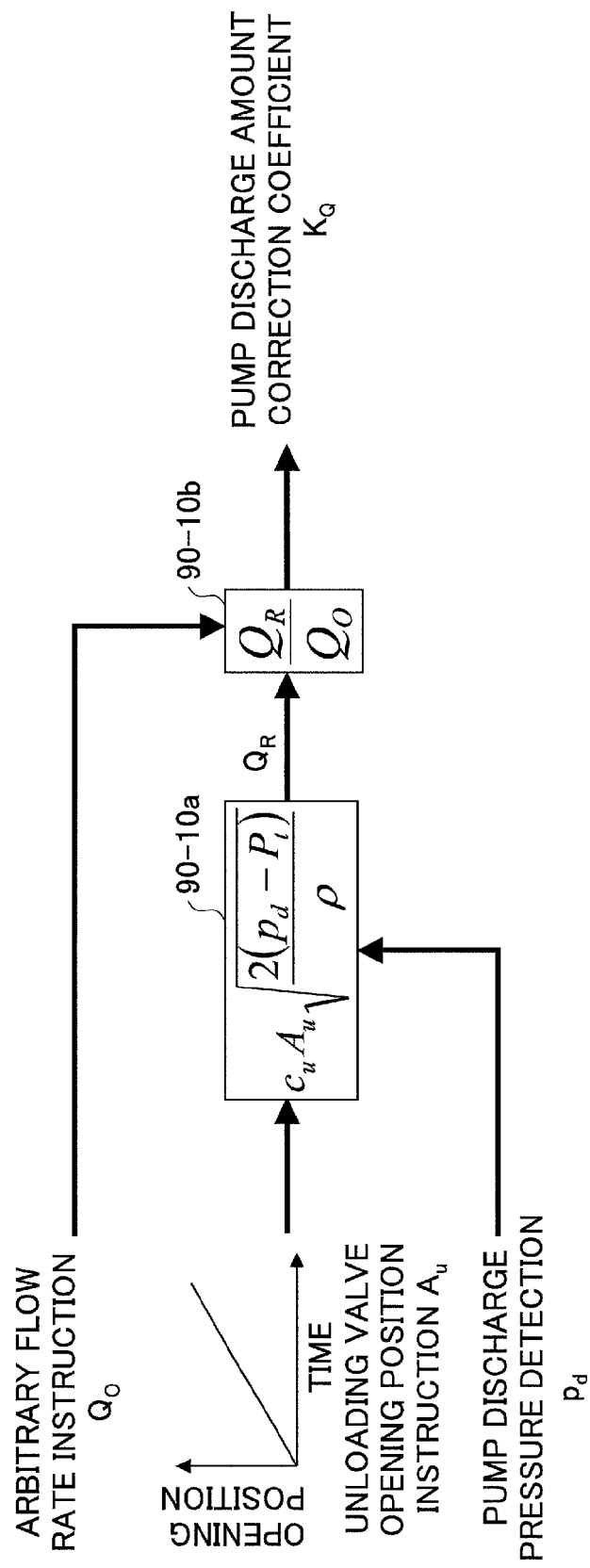
FIG. 13 is a block diagram for illustrating a calculation block of the pump discharge instruction correction coefficient $K_Q$ related to FIG. 12.

FIG. 12 is a flowchart for illustrating an example of a calculation process of a pump discharge instruction correction coefficient $K_Q$ executed by a controller 10 according to the embodiment. FIG. 13 is a block diagram for illustrating a calculation block of the pump discharge instruction correction coefficient $K_Q$ related to FIG. 12.

In step 1200, an operating state of the construction machine 1 is detected.

In step 1202, it is determined whether the engine is in an idle state. If the engine 17 is in an idle state, the process routine goes to step 1004. On the other hand, if engine 17 is not in an idle state, a state for waiting for the idling is formed. It is noted that, during the idling of the engine 17, the arm operation amount LS1, the boom operation amount LS2 and the bucket operation amount LS3 are 0, and the unloading valve 18 is kept in the opens state (maximum opening position).

In step 1204, a predetermined command value for the discharge flow rate of the hydraulic pump 11 is calculated. The predetermined command value $Q_O$ of the discharge flow rate of the hydraulic pump 11 may be arbitrary as long as the pump discharge pressure $p_d$ is appropriately detected in step 1208. Further, the predetermined command value $Q_O$ of the discharge flow rate of the hydraulic pump 11 may be constant, or may increase or decrease with time (with a constant change rate, for example).

In step 1206, the opening of the unloading valve 18 is changed with an arbitrary change rate. For example, the opening of the unloading valve 18 may be changed such that it gradually increases to the maximum opening position over a predetermined time (see an unloading valve opening position instruction $A_u$ in FIG. 13). Alternatively, the opening position of the unloading valve 18 may be changed or kept at an arbitrary predetermined opening position between 0 and the maximum value.

In step 1208, the pump discharge pressure $p_d$ detected by the oil pressure sensor 30 is obtained during the change of the opening position of the unloading valve 18. Alternatively, the pump discharge pressure $p_d$ may be obtained during the unloading valve 18 at an arbitrary predetermined opening position.

In step 1210, the actual discharge flow rate $Q_R$ of the hydraulic pump 11 during the change of the opening position of the unloading valve 18 may be calculated based on the command value (unloading valve opening position instruction $A_u$) for the opening position of the unloading valve 18 and the pump discharge pressure $p_d$ detected by the oil pressure sensor 30 during the change of the opening position of the unloading valve 18. The actual discharge flow rate $Q_R$ of the hydraulic pump 11 may be calculated utilizing the restriction formula (formula 8) described above (see a block 90-10a in FIG. 13). In the block 90-10a in FIG. 13, the pressure difference between the pump discharge pressure $p_d$ and a tank pressure $p_t$ is used as the pressure difference in the restriction formula (formula 8) described above. The tank pressure $p_t$ may be assumed to be 0.

In step 1212, an absolute value of a difference between the instructed discharge flow rate $Q_O$ of the hydraulic pump 11 and the actual discharge flow rate $Q_R$ calculated in step 1210 is greater than or equal to a predetermined threshold. The predetermined threshold is set for determining whether the difference is great enough to be compensated for by the correction with the pump discharge instruction correction coefficient $K_Q$ described hereinafter. The predetermined threshold may be determined according to the required accuracy of the control. If the absolute value of the difference between the instructed discharge flow rate $Q_O$ of the hydraulic pump 11 and the actual discharge flow rate $Q_R$ is greater than or equal to the predetermined threshold, the process routine goes to step 1214. On the other hand, the absolute value of the difference between the instructed discharge flow rate $Q_O$ of the hydraulic pump 11 and the actual discharge flow rate $Q_R$ is less than the predetermined threshold, the process routine ends, determining that the correction is not necessary now.

In step 1214, the pump discharge instruction correction coefficient $K_Q$ is calculated and the previous value is changed (updated). The ratio between the instructed discharge flow rate $Q_O$ of the hydraulic pump 11 and the actual discharge flow rate $Q_R$ may be calculated as the pump discharge instruction correction coefficient $K_Q$ ($K_Q=Q_R/Q_O$) (see a block 90-10b in FIG. 13). In this way, when the conditions of step 1202 and step 1212 are met, the pump discharge instruction correction coefficient $K_Q$ is calculated by blocks 90-10a and 10b in FIG. 13. The command value of the discharge flow rate of the hydraulic pump 11 is multiplied by the pump discharge instruction correction coefficient $K_Q$ thus calculated in a block 90-10 in FIG. 9 to correct the command value of the discharge flow rate.

According to the configuration illustrated in FIG. 9, FIG. 12 and FIG. 13, even if a deviation between the command value of the discharge flow rate and the actual discharge flow rate of the hydraulic pump 11 occurs due to the secular degradation, the virtual bleed system that can compensate for such a deviation can be implemented. In other words, by compensating for the change in the viscosity, the real pressure applied to the directional control valves 20, 22 and 24 can be calculated with high accuracy, which enhances the reproducibility of the negative control system in the virtual bleed system.

The present invention is disclosed with reference to the preferred embodiments. However, it should be understood that the present invention is not limited to the above-described embodiments, and variations and modifications may be made without departing from the scope of the present invention.

What is claimed is:

1. A hydraulic control apparatus that controls a hydraulic pump in a construction machine in which a hydraulic actuator is connected to the hydraulic pump via a directional control valve of a closed center type, and in which a position of the directional control valve is changed according to an operation amount of an operation member, the hydraulic control apparatus comprising an electronic controller, the electronic controller being configured to:

calculate a virtual bleed opening area from a given virtual bleed opening area characteristic related to the directional control valve, based on the operation amount of the operation member, calculate, based on the calculated virtual bleed opening area and a discharge pressure of the hydraulic pump, a virtual negative control pressure when a negative control system is assumed;

calculate a control command value for the hydraulic pump based on the virtual negative control pressure; and control the hydraulic pump based on the calculated control command value.

2. The hydraulic control apparatus of claim 1, wherein the construction machine has an unloading valve connecting to a tank, the unloading valve being provided between the directional control valve and the hydraulic pump, and the electronic controller is further configured to calculate a pump discharge pressure correction coefficient based on an actual viscosity and a reference viscosity, and correct the control command value for the hydraulic pump by multiplying the discharge pressure of the hydraulic pump by the calculated pump discharge pressure correction coefficient, wherein the actual viscosity is estimated based on the discharge pressure of the hydraulic pump when a command value of a predetermined discharge flow rate is applied to the hydraulic pump during idling, and the reference viscosity is estimated based on an oil temperature when the command value of the predetermined discharge flow rate is applied to the hydraulic pump during idling.

3. The hydraulic control apparatus of claim 1, wherein the construction machine has an unloading valve of a proportional control valve type connecting to a tank, the unloading valve being provided between the directional control valve and the hydraulic pump, the electronic controller is further configured to calculate a pump discharge flow rate correction coefficient based on an actual discharge flow rate and a predetermined discharge flow rate, and correct the control command value for the hydraulic pump by multiplying the control command value by the calculated pump discharge flow rate correction coefficient, wherein the actual discharge flow rate is estimated based on the discharge pressure of the hydraulic pump when a command value of the predetermined discharge flow rate is applied to the hydraulic pump and an opening position of the unloading valve is kept at a predetermined opening position between 0 and a maximum value during idling.

4. A method of controlling a hydraulic pump in a construction machine in which a hydraulic actuator is connected to the hydraulic pump via a directional control valve of a closed center type, and in which a position of the directional control valve is changed according to an operation amount of an operation member, the method comprising:

calculating a virtual bleed opening area from a given virtual bleed opening area characteristic related to the directional control valve, based on the operation amount of the operation member, calculating, based on the calculated virtual bleed opening area and a discharge pressure of the hydraulic pump, a virtual negative control pressure when a negative control system is assumed;

calculating a control command value for the hydraulic pump based on the virtual negative control pressure; and controlling the hydraulic pump based on the calculated control command value.

* * * * *